(12) United States Patent  
Yun et al.

(10) Patent No.: US 7,967,460 B2  
(45) Date of Patent: Jun. 28, 2011

(54) PLANAR LIGHT SOURCE AND BACKLIGHT UNIT INCLUDING THE SAME

(75) Inventors: Hyeong Won Yun, Gyunggi-do (KR); Won Ki Lee, Gyunggi-do (KR); Chang Hoon Baek, Gyunggi-do (KR); Kil Yoan Chung, Gyunggi-do (KR)

(73) Assignee: Samsung LED Co., Ltd., Gyunggi-Do (KR)

( * ) Notice: Subject to any disclaimer, the term of this patent is extended or adjusted under 35 U.S.C. 154(b) by 264 days.

(21) Appl. No.: 12/266,851

(22) Filed: Nov. 7, 2008

(65) Prior Publication Data

US 2009/0316386 A1    Dec. 24, 2009

(30) Foreign Application Priority Data

Jun. 19, 2008    (KR) .................. 10-2008-0057863

(51) Int. Cl.  
  *F21V 9/14* (2006.01)  
(52) U.S. Cl. ....... 362/97.1; 362/612; 362/613; 362/227; 362/249.01; 362/249.02  
(58) Field of Classification Search .................. 362/612, 362/613, 249.01, 249.02, 227, 97.3  
See application file for complete search history.

(56) References Cited

U.S. PATENT DOCUMENTS

| | | | | |
|---|---|---|---|---|
| 6,000,812 A | * | 12/1999 | Freeman et al. | 362/249.01 |
| 7,387,421 B2 | * | 6/2008 | Lee et al. | 362/612 |
| 7,661,834 B2 | * | 2/2010 | Fenyo | 362/19 |
| 7,677,750 B2 | * | 3/2010 | Jeon et al. | 362/97.3 |

FOREIGN PATENT DOCUMENTS

| KR | 2007-0007584 A | 1/2007 |
|---|---|---|
| KR | 2007-0074825 A | 7/2007 |

\* cited by examiner

*Primary Examiner* — Anabel M Ton  
(74) *Attorney, Agent, or Firm* — McDermott Will & Emery LLP

(57) ABSTRACT

A planar light source and a backlight unit including the same are disclosed. The planar light source includes a light emission region formed by arrangements of light emitting devices. The light emission region includes first to $n^{th}$ separate parts each having a center of the light emission region as one vertex (n: natural number of 2 or higher). The first separate part includes light emitting devices arranged two-dimensionally in first and second directions. A pitch in the first direction is different from a pitch in the second direction in at least a portion of the two-dimensional arrangement structure. Light emitting devices of each of the second to $n^{th}$ separate parts have an arrangement structure obtained by a clockwise or counter-clockwise rotation of the arrangement structure of the light emitting devices of the first separate part by an angle of $1/n \times 360°$ about the center of the light emission region.

14 Claims, 7 Drawing Sheets

PLANAR LIGHT SOURCE AND BACKLIGHT UNIT INCLUDING THE SAME

CROSS-REFERENCE TO RELATED APPLICATIONS

This application claims the priority of Korean Patent Application No. 2008-0057863 filed on Jun. 19, 2008, in the Korean Intellectual Property Office, the disclosure of which is incorporated herein by reference.

BACKGROUND OF THE INVENTION

1. Field of the Invention

The present invention relates to a planar light source and a backlight unit including the same, and more particularly, to a planar light source, which can achieve a uniform luminance distribution and high efficiency while using a decreased number of light emitting devices by optimizing an arrangement and an interval of the light emitting devices.

2. Description of the Related Art

A cold cathode fluorescent lamp (CCFL) is used as a light source of a related art backlight unit of a liquid crystal display (LCD). However, the CCFL uses a mercury gas, which may contaminate the environment. The CCFL also has limitations of slow response time and low color reproducibility and besides is not appropriate for a slim and light LCD panel.

Compared to the CCFL, light emitting diodes (LEDs) are ecological, and are useful for video signal streams and capable of impulsive driving because of its quick response time of a few nano seconds. The LEDs have color reproducibility of 100% or higher and allow arbitrary changes in luminance, a color temperature or the like through the control of the quantity of light of red, green and blue LEDs. Besides, they are suitable for slim and light LCD panels. For these reasons, the LED is being widely used as a light source for a backlight unit of an LCD panel or the like.

LCD backlight units employing the LEDs may be categorized into edge-type backlight units and direct-type backlight units according to locations of light sources. In the edge-type backlight unit, a horizontally elongated bar-type light source is placed at an edge side to emit light to an entire surface of an LCD panel through a light guide plate. In the direct-type backlight unit, a planar light source having almost the same area as the LCD panel is placed under the LCD panel to emit light directly to the entire surface of the LCD panel.

FIG. 1 is a plan view illustrating an arrangement of light emitting devices in a related art planar light source.

As shown in FIG. 1, a planar light source 100 used in the related art direct type LCD panel has a structure in which a plurality of LEDs 102 are arranged in rows and columns on a substrate 101. In this case, adjacent LEDs 102 have a pitch (x) in an x-direction and a pitch (y) in a y-direction that are equal to each other. Thus, adjacent four LEDs 102 of the plurality of LEDs 102 form a regular square.

This arrangement of the LEDs 102 is inefficient because more LEDs than needed are used in order to cover a light emitting area.

Besides, there may be a great difference in luminance between an area adjacent to the LEDs 102 and an area located away from the LEDs 102, i.e., a very center of the square formed by four LEDs 102. That is, if a large number of LEDs 102 are arranged, uniform luminance can be achieved. However, if the number of LEDs is reduced for the improved efficiency, the distance between adjacent LEDs is increased, which may change the luminance distribution.

Therefore, with respect to a planar light source used for an LCD panel or the like, there is a need for a method for improving efficiency of the planar light source by reducing the number of light emitting devices used therein while securing small variations in luminance, i.e., uniform luminance.

SUMMARY OF THE INVENTION

An aspect of the present invention provides a planar light source which can achieve a uniform luminance distribution and high efficiency while using a decreased number of light emitting devices by optimizing an arrangement and an interval of the light emitting devices An aspect of the present invention also provides a backlight unit which can improve light emission efficiency by employing the planar light source and controlling a location of an optical sheet.

According to an aspect of the present invention, there is provided a planar light source including: a light emission region formed by arrangements of a plurality of light emitting devices, the light emission region including first to $n^{th}$ separate parts each having a center of the light emission region as one of vertexes thereof, where n is a natural number of 2 or higher, wherein the first separate part includes a plurality of light emitting devices having a two-dimensional arrangement structure in first and second directions which are different from each other, and a pitch in the first direction is different from a pitch in the second direction in at least a portion of the two-dimensional arrangement structure, and light emitting devices included in each of the second to $n^{th}$ separate parts have an arrangement structure obtained by a clockwise or counter-clockwise rotation of the arrangement structure of the light emitting devices of the first separate part by an angle of $1/n \times 360°$ about the center of the light emission region.

The n may be a natural number of 3 or higher, and the light emission region has a regular n-gon shape. In this case, the light emission region may have a regular square shape.

The light emission region may have a circular shape.

The first and second directions may form an angle of $1/n \times 360°$ therebetween. In this case, the first direction may be the same as a direction of a boundary line between the first separate part and the second separate part, and the second direction may be the same as a direction of a boundary line between the first separate part and the $n^{th}$ separate part.

The light emitting device may be a light emitting diode (LED).

If the pitch in the second direction is greater than the pitch in the first direction, the pitch in the first direction may range from about 26 mm to about 27 mm. The pitch in the second direction may range from about 29 mm to about 37 mm.

The light emitting device may emit white light.

According to another aspect of the present invention, there is provided a backlight unit including: a substrate; a planar light source including a light emission region formed by arrangement structures of a plurality of light emitting devices, the light emission region including first to $n^{th}$ separate parts each having a center of the light emission region as one of vertexes thereof, where n is a natural number of 2 or higher, wherein the first separate part includes a plurality of light emitting devices having a two-dimensional arrangement structure in first and second directions which are different from each other, and a pitch in the first direction is different from a pitch in the second direction in at least a portion of the two-dimensional arrangement structure, and light emitting devices included in each of the second to $n^{th}$ separate parts have an arrangement structure obtained by a clockwise or counter-clockwise rotation of the arrangement structure of the light emitting devices of the first separate part by an angle of 1/n×360° about the center of the light emission region; and a diffusion sheet disposed on the planar light source and uniformly diffusing light incident from the planar light source.

A distance from a top surface of each of the light emitting devices included in the planar light source to the diffusion sheet may be greater than a distance between adjacent ones of the light emitting devices.

The backlight unit may further include a reflective layer disposed on the substrate and reflecting light emitted from the light emitting devices upwardly.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
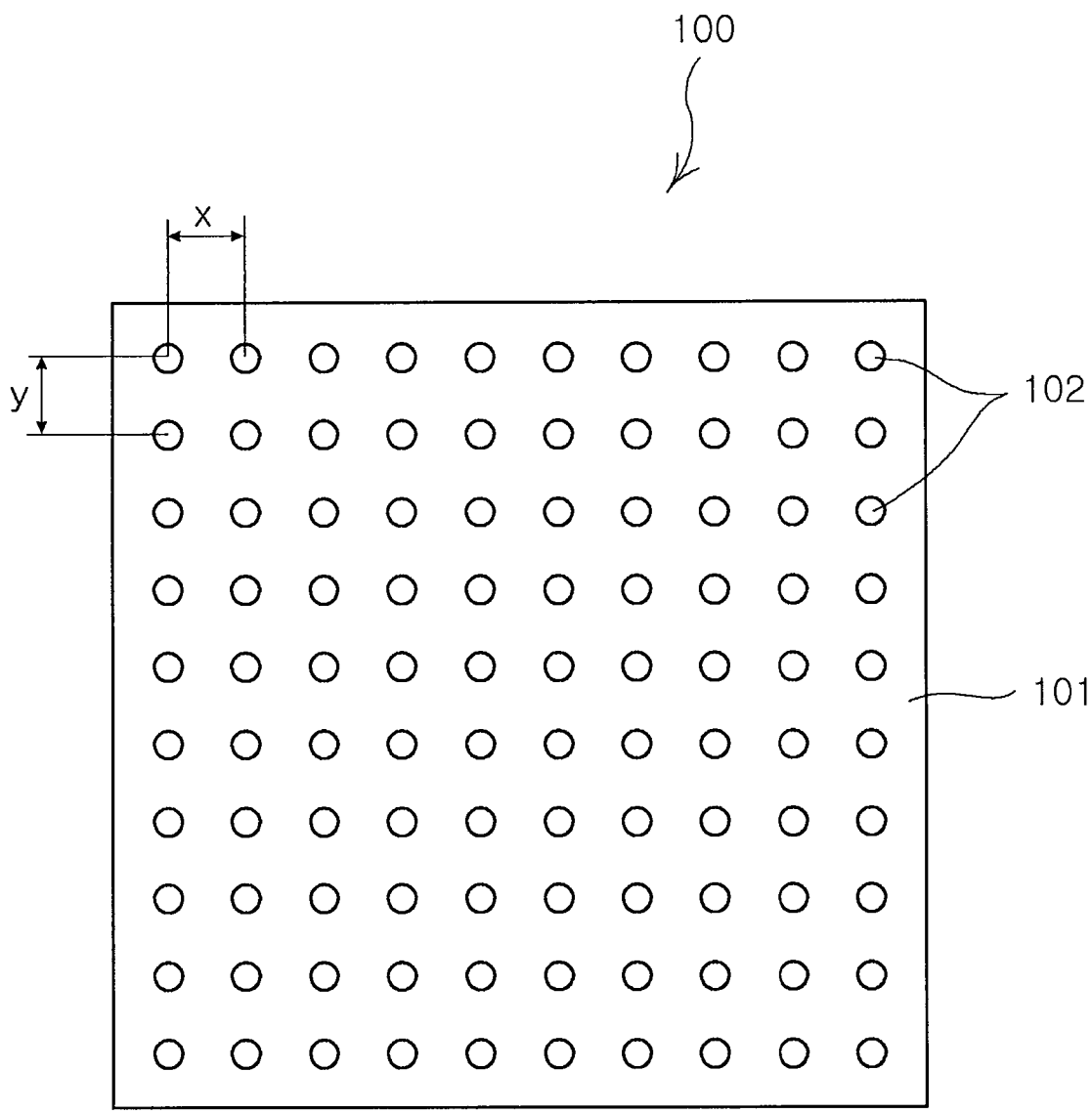
FIG. 1 is a plan view illustrating an arrangement of light emitting devices in a related art planar light source.

Exemplary embodiments of the present invention will now be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the dimensions and shapes of the elements are exaggerated for clarity of illustration. Like reference numerals refer to like elements throughout.

Figure 2:
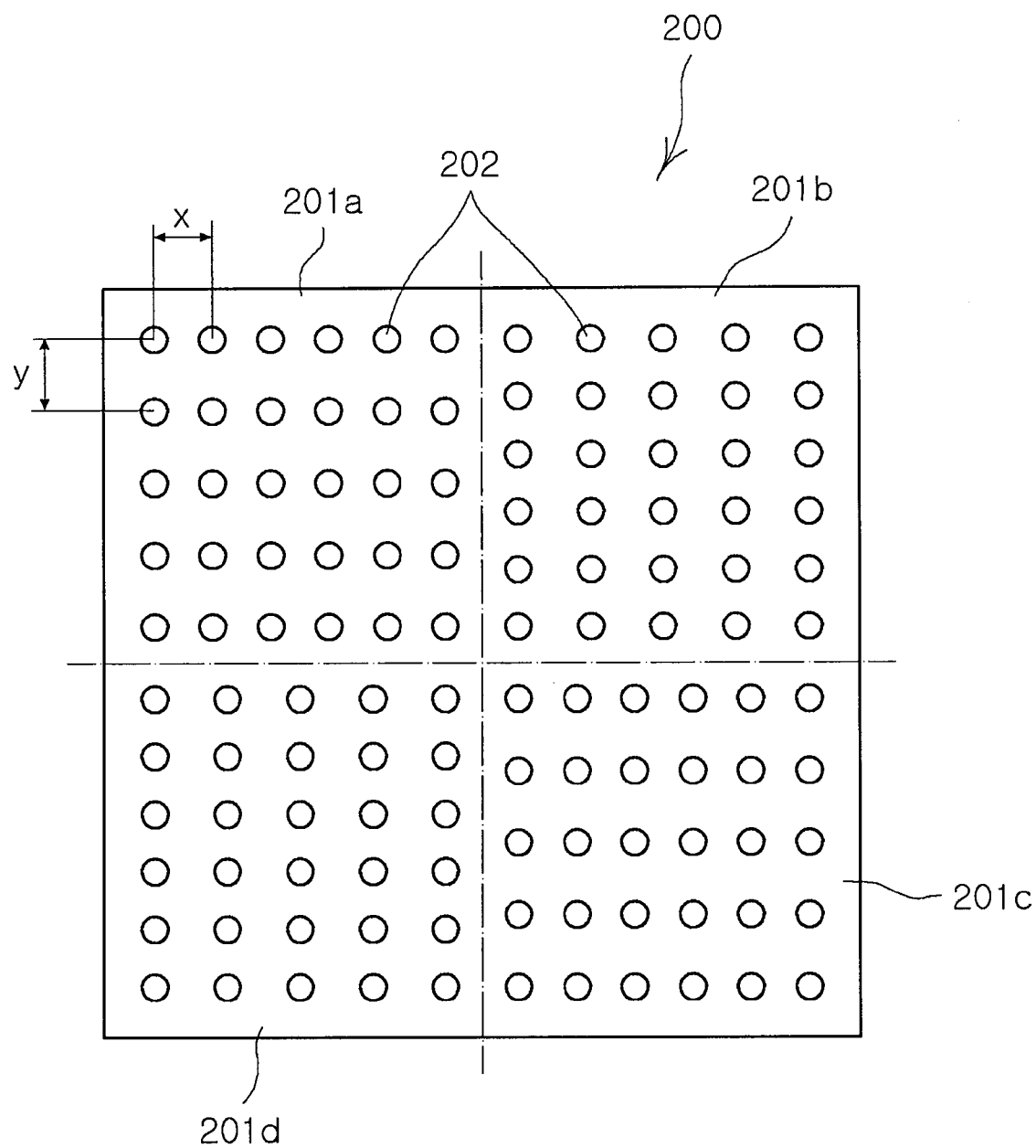
FIG. 2 is a plan view illustrating an arrangement of light emitting devices in a planar light source according to an exemplary embodiment of the present invention.
Figure 3:
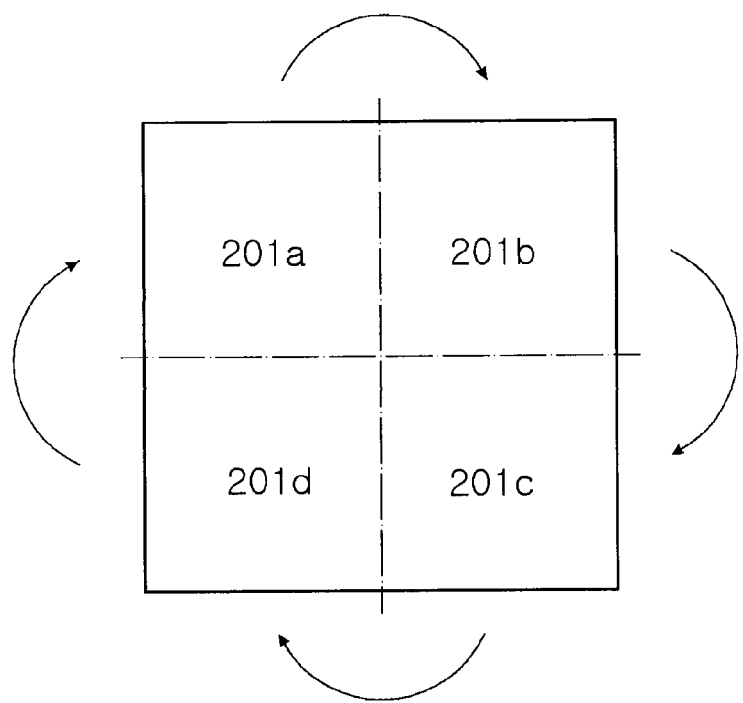
FIGS. 3 and 4 illustrate a rotation-disposition of separate parts of FIG. 2.
Figure 4:
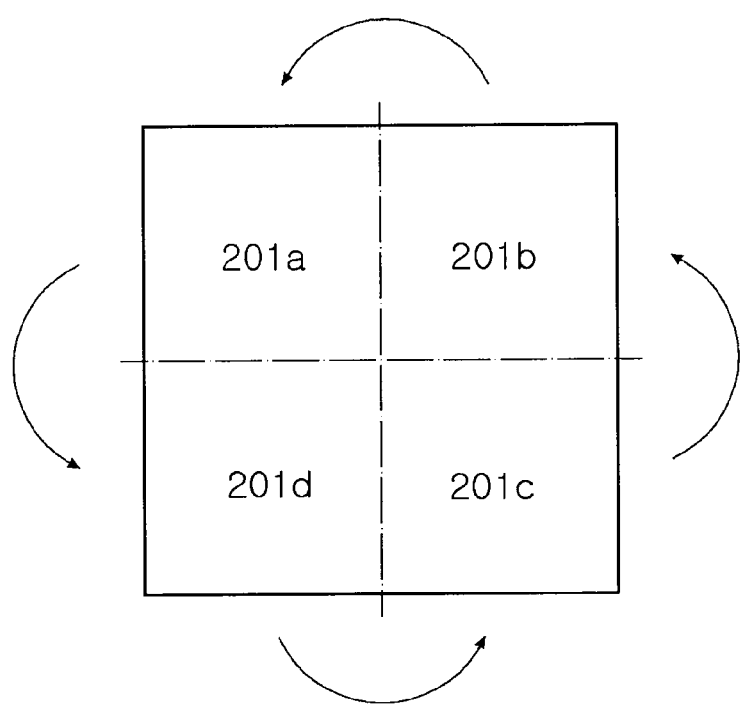

FIG. 2 is a plan view illustrating an arrangement of light emitting devices in a planar light source according to an exemplary embodiment of the present invention. FIGS. 3 and 4 illustrate a rotation-disposition of separate parts of FIG. 2.

Referring to FIG. 2, a planar light source 200 according to this embodiment includes a plurality of light emitting devices 202 arranged on a substrate. The plurality of light emitting devices 202 are arranged two-dimensionally in rows and columns, thereby forming a light emission region 201. As the light emitting devices 202 emit white light, the planar light source 200 may be used for, e.g., a backlight unit or lighting equipment. Particularly, by using LEDs as the light emitting devices 202, efficiency can be further improved. As shown in FIG. 2, the light emission region has a regular square structure and may be divided into four separate parts 201a, 201b, 201c and 201d with equal areas.

The separate parts 201a, 201b, 201c and 201d each have a regular square shape but have a different arrangement of the light emitting devices. The separate parts 201a, 201b, 201c and 201d may be also referred to as first, second, third and fourth separate parts, respectively. In the first separate part 201a, a plurality of light emitting devices 202 are arranged in rows and columns, i.e., in first and second directions. Unlike the related art, a pitch x in an x-direction is different from a pitch y in a y-direction. Hereinafter, the x-direction is also referred to as a first direction and the y-direction is also referred to as a second direction. According to this embodiment, the pitch y in the y-direction is greater than the pitch x in the x-direction corresponding to a magnitude that can be generally employed. Thus, the total number of light emitting devices 202 can be reduced. Specifically, the pitch x in the x-direction ranges from about 26 mm to about 27 mm, and the pitch y in the y-direction ranges from about 29 mm to about 37 mm. Although the pitch y in the y-direction is greater than the pitch x in the x-direction in this embodiment, the pitch x in the x-direction may be greater than the pitch y in the y-direction depending on embodiments. That is, the pitch x in the x-direction is different from the pitch y in the y-direction. The pitch used throughout this application means a distance between centers of adjacent light emitting devices 202 spaced apart from each other in one direction.

In the second separate part 201b, a plurality of light emitting devices 202 are arranged in rows and columns as in the first separate part 201a, particularly, in a structure obtained by rotating the arrangement structure of the light emitting devices 202 of the first separate part 201a clockwise by 90°. Thus, in the second separate part 201b, a pitch in the x-direction is greater than a pitch in a y-direction. Likewise, the third separate part 201c has a structure obtained by rotating the arrangement structure of the light emitting devices 202 of the second separate part 201b clockwise by 90°. The fourth separate part 201d has a structure obtained by rotating the arrangement structure of the light emitting devices 202 of the third separate part 201c clockwise by 90°. As shown in FIG. 3, in this arrangement method for the light emitting devices 202 employed in this embodiment, the arrangement structures of the second through fourth separate parts 201b, 201c and 201d are respectively determined by successive 90-degree clockwise rotations with reference to the first separate part 201a. This may be called an 'inequality rotation-disposition structure', which is compared to a related art equality disposition structure. Here, the terms 'equality' and 'inequality' are associated with whether pitches in the x- and y-directions are equal to one another or not.

The rotation-disposition structure can contribute to minimizing luminance non-uniformity, which may be caused due to the increase in pitch y in the y-direction. In the first separate part 201a, the pitch y in the y-direction is greater than the pitch x in the x-direction, which is opposite in the second separate part 201b. Also, the third separate part 201c is opposite to the second separate part 201b. The arrangement structure of the fourth separate part 201d obtained by rotating the third separate part 201c clockwise by 90° is the same as that of the second separate part 201b. Since adjacent separate parts have opposite arrangement structures, the luminance non-uniformity caused by different pitches x and y in the x-direction and the y-direction can be minimized. Consequently, the planar light source 200 can maintain the uniformity of the luminance distribution while using a reduced number of light emitting devices 202. The luminance may be lowered as the number of light emitting devices 202 is reduced, but this can be overcome by increasing an injection current.

Rotation from the first separate part 201a to determine the respective arrangement structures of the second to fourth separate parts 201b to 201d may be made in an opposite manner to that illustrated in FIG. 3. That is, as shown in FIG. 4, the second separate part 201b may have a structure obtained by rotating the first separate part 201a counter-clockwise by 90°. Also, the third separate part 201c and the fourth separate part 201d may have structures determined by rotating the second separate part 201b and the third separate part 201c counter-clockwise by 90°, respectively. If the disposition type of the first separate part 201a and an area occupied by the first separate part 201a in the entire light emission region are determined, the disposition types of the rest of separate parts can be determined by rotating the first separate part 201a clockwise or counter-clockwise. Whichever the direction of the rotation of the first separate part 201a is, the luminance uniformity and the decrease in number of light emitting devices can be obtained.

Figure 5:
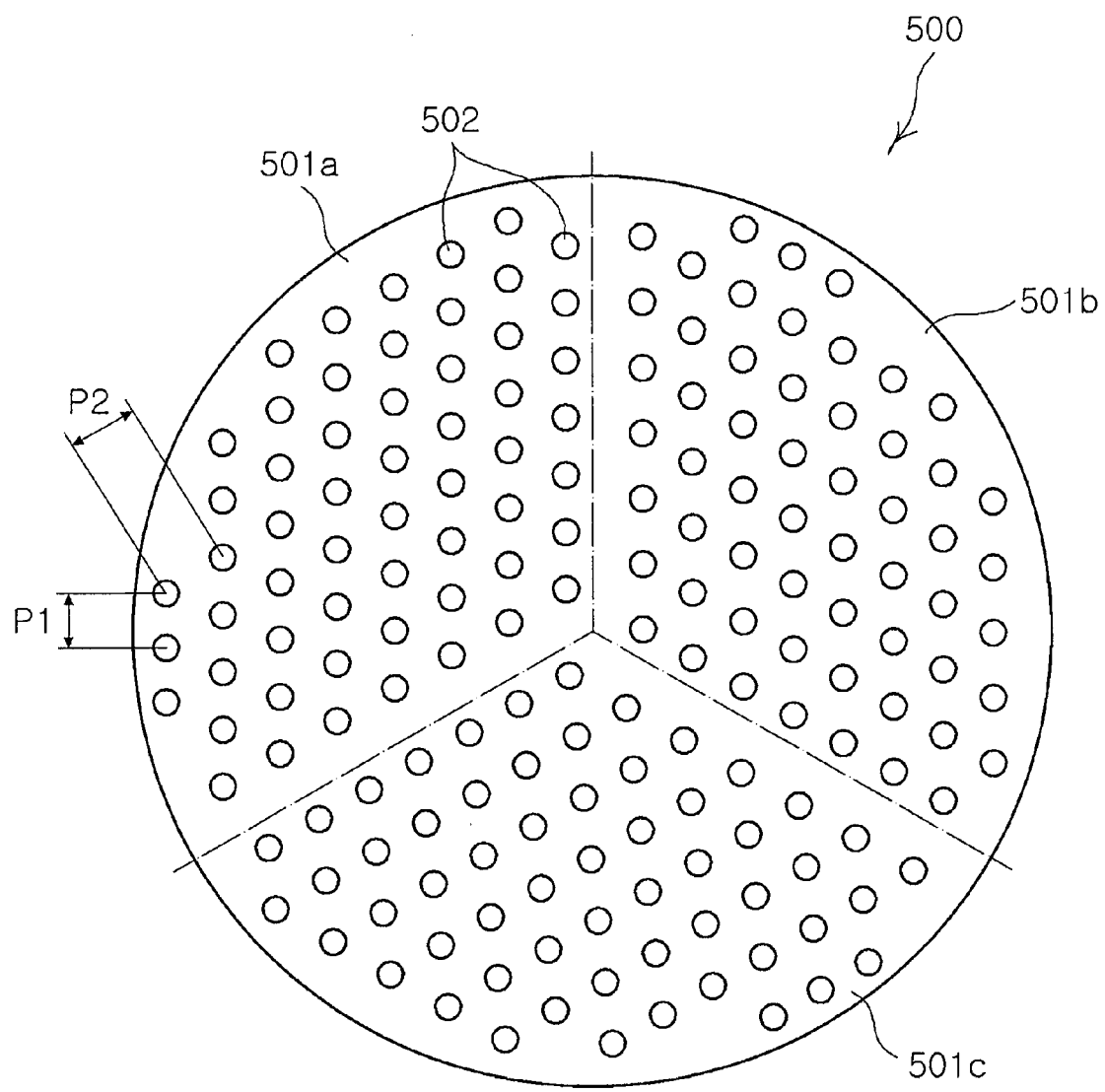
FIG. 5 is a plan view illustrating an arrangement of light emitting devices in a planar light source according to another exemplary embodiment of the present invention.

FIG. 5 is a plan view illustrating an arrangement of light emitting devices in a planar light source according to another exemplary embodiment of the present invention.

Referring to FIG. 5, according to this embodiment, a light emission region of a planar light source 500 has a circular shape. The light emission region is divided into three separate parts, i.e., first to third separate parts 501a, 501b and 501c. The first to third separate parts 501a, 501b and 501c are sectors each having a central angle of 120° (i.e., 360°/3) at the center of the light emission region. Light emitting devices 502 in the first separate part 501a are arranged two-dimensionally in first and second directions. The first and second directions form an angle of 120°. In this case, the first direction is the same as a direction of a boundary line between the first separate part 501a and the second separate part 501b. The second direction is the same as a direction of a boundary line between the first separate part 501a and the third separate part 501c. Also, a pitch P1 in the first direction is different from a pitch P2 in the second direction, and specifically, the pitch P2 in the second direction is greater than the pitch P1 in the first direction. As in the previous embodiment, the pitch P1 in the first direction may be greater than the pitch P2 in the second direction, provided that the respective pitches P1 and P2 in the first and second directions are different from each other.

As shown in FIG. 5, the second separate part 501b has a structure obtained by rotating the first separate part 501a clockwise by 120°, and the third separate part 501c has a structure obtained by rotating the second separate part 501b clockwise by 120°. In this case, the rotation direction may be a counter-clockwise direction. Even when the light emitting region has a circular shape, the light emitting region may be divided into three portions. Even if any one of the separate parts has an arrangement of light emitting devices having a greater pitch in one direction, the non-uniformity of the luminance distribution can be minimized through the rotation-dispositions of the separate parts.

Figure 6:
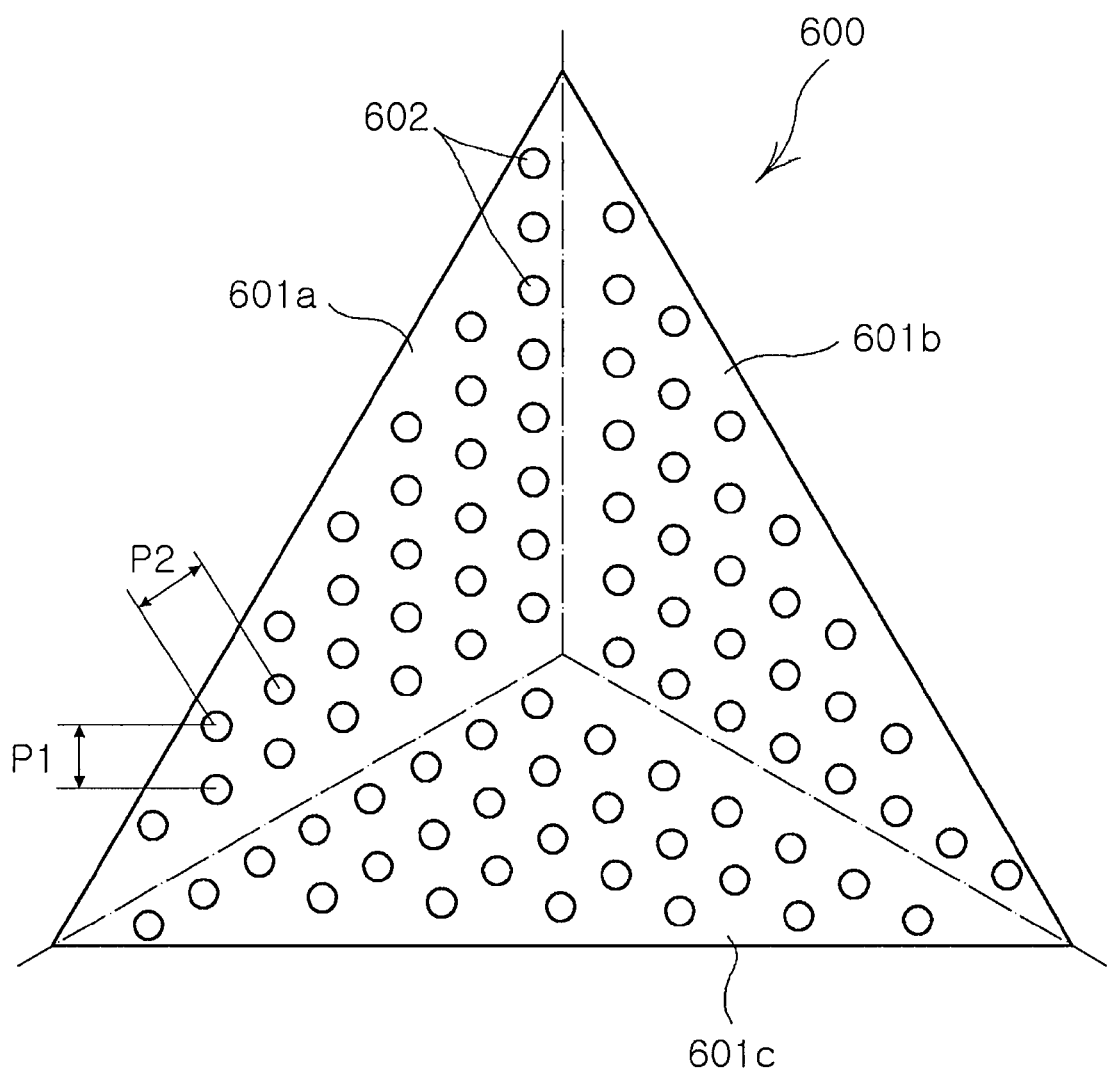
FIGS. 6 and 7 are plan views of alternatives of the arrangement of the light emitting devices of the planar light source of FIG. 5.
Figure 7:
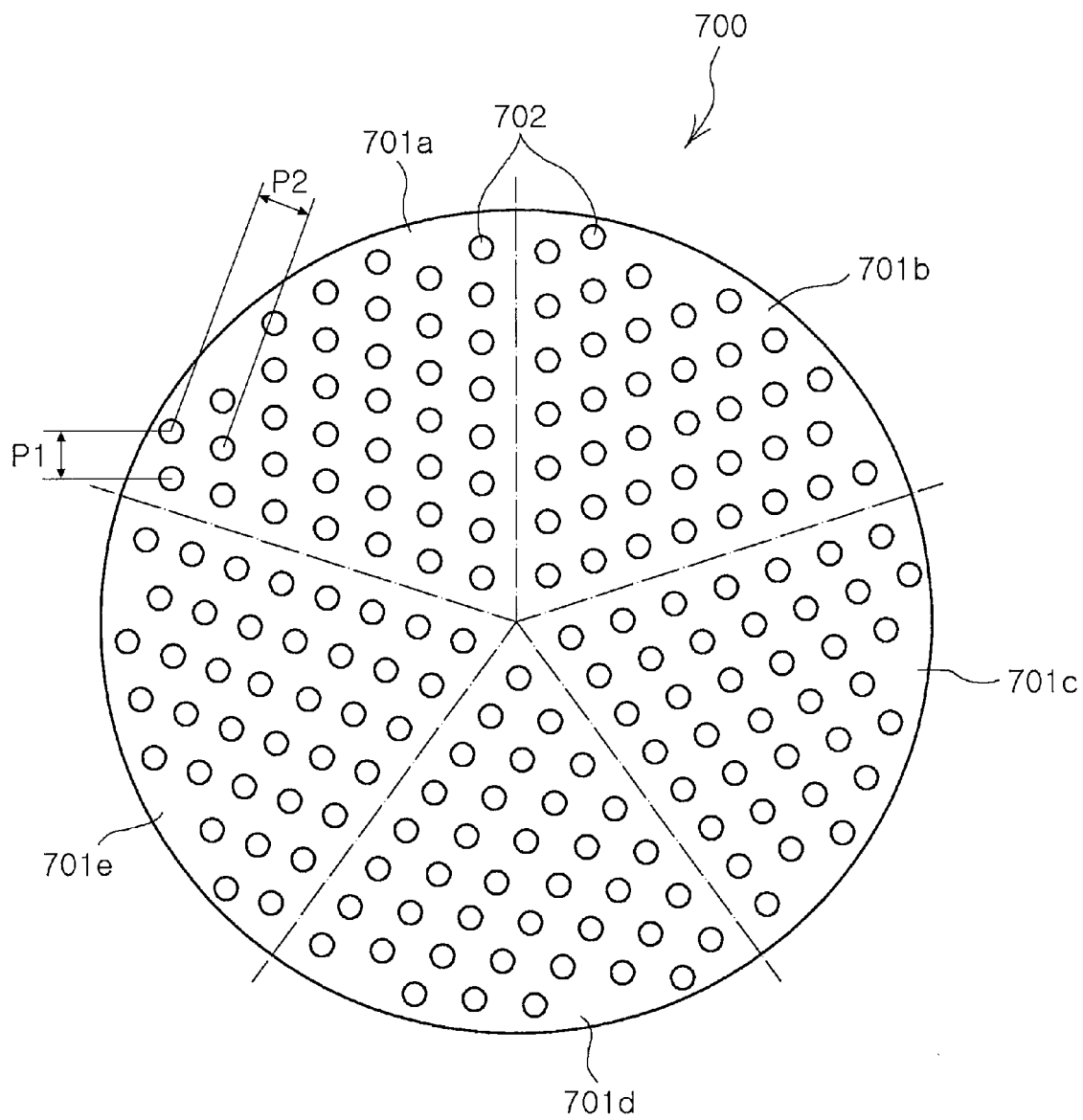

FIGS. 6 and 7 are plan views of alternatives of the arrangement of the light emitting devices of the planar light source of FIG. 5.

According to the embodiment of FIG. 6, a light emission region of a planar light source 600 has a regular triangle shape. The light emission region is divided into three portions, i.e. , first to third separate parts 601a, 601b and 601c. The first to third separate parts 601a, 601b and 601c each have an isosceles triangle having a central angle of 120° (i.e., 360°/3) at the center of the light emission region. In this case, the first direction is the same as a direction of a boundary line between the first separate part 601a and the second separate part 601b, and the second direction is the same as a direction of a boundary line between the first separate part 601a and the third separate part 601c. Also, light emitting devices 602 in the first separate part 601a are arranged two-dimensionally in first and second directions. The first and second directions form 120° therebetween. A pitch P1 in the first direction is different from a pitch P2 in the second direction, and specifically, the pitch P2 in the second direction is greater than the pitch P1 in the first direction.

According to the embodiment of FIG. 7, a light emission region of a planar light source 700 has a circular shape as in the embodiment of FIG. 5, but is divided into five separate parts 701a to 701e. In this case, the first to fifth separate parts 701a to 701e each have a sector shape having a central angle of 72° (i.e., 360°/5) at the center of the light emission region. Light emitting devices 702 in the first separate part 701a are arranged two-dimensionally in first and second directions, and the first and second directions form an angle of 72° therebetween. In this case, the first direction is the same as a direction of a boundary line between the first separate part 701a and the second separate part 701b, and the second direction is the same as a direction of a boundary line between the first separate part 701a and the fifth separate part 701e. A pitch P1 in the first direction is different from a pitch P2 in the second direction, and specifically, the pitch P2 in the second direction is greater than the pitch P1 in the first direction.

The second separate part 701b has a structure obtained by rotating the first separate part 701 clockwise by 72°, and the third separate part 701c has a structure obtained by rotating the second separate part 701b clockwise by 720. Also, the fourth and fifth separate parts 701d and 701e may be formed in the same manner. In this case, the rotation direction may be counter-clockwise. Although not shown, the light emission region may have a regular pentagon shape. A rotation-disposition structure of separate parts that can be used in the present invention is not limited by the shape of the light emission region and may be applied even when the light emission region has a regular n-gon shape. Even if the entire light emission region does not have a regular n-gon shape or a circular shape, a regular n-gon shape or a circular shape may be formed in a portion of the light emission region, and an arrangement structure of light emitting devices included in the portion may have an inequality rotation-disposition structure described with reference to FIGS. 1 through 7. This may also be considered to fall within the scope of the present invention.

Figure 8:
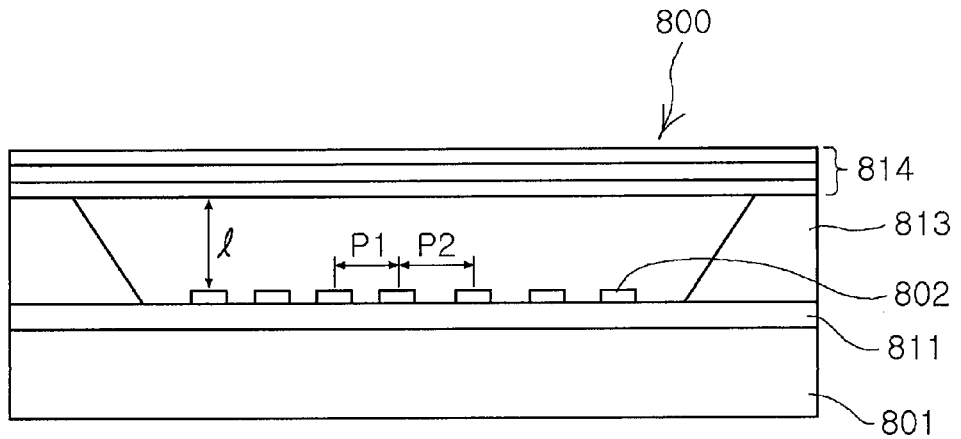
FIG. 8 is a cross-sectional view of a backlight unit according to an exemplary embodiment of the present invention.

The planar light source having the above structure may be employed for, e.g., a backlight unit that emits light at the rear of an LCD panel. FIG. 8 is a cross-sectional view of a backlight unit according to an exemplary embodiment of the present invention.

Referring to FIG. 8, a backlight unit 800 according to this embodiment includes a planar light source having a structure described above with reference with FIGS. 1 through 7. The planar light source includes a plurality of light emitting devices 802 disposed on a substrate 801. The light emitting devices 802 are arranged with different pitches P1 and P2. Although not shown in detail in FIG. 8, a light emission region of the planar light source is divided into n portions, i.e., first to $n^{th}$ separate parts. The second to $n^{th}$ separate parts are formed respectively by successive clockwise or counter-clockwise rotations, each an angle of 360°/n, from the first separate part.

An optical sheet 814 is disposed on the planar light source. The optical sheet 814 includes a diffusion sheet or a diffusion plate uniformly diffusing incident light, and the like. The optical sheet 814 may further include a protection sheet protecting an optical structure under the protection sheet. A sidewall 813 is formed on an edge of a top surface of the substrate 801 to surround the light emitting devices 802. The sidewall 813 has a surface inclined toward the light emitting devices 802. A reflective layer 811 may be provided on the top surface of the substrate 801 to reflect light emitted from the light emitting devices 802 upwardly. The pitches P1 and P2, which are arrangement intervals between the light emitting devices 802 may be smaller than an optical distance e. If this condition is not satisfied, the luminance uniformity of the planar light source may be degraded, and hot spots may appear. The optical distance l may be understood as a distance from a light emission surface of the light emitting device 802 to the optical sheet 814, i.e., a distance at which light propagates in a vertical direction.

Figure 9:
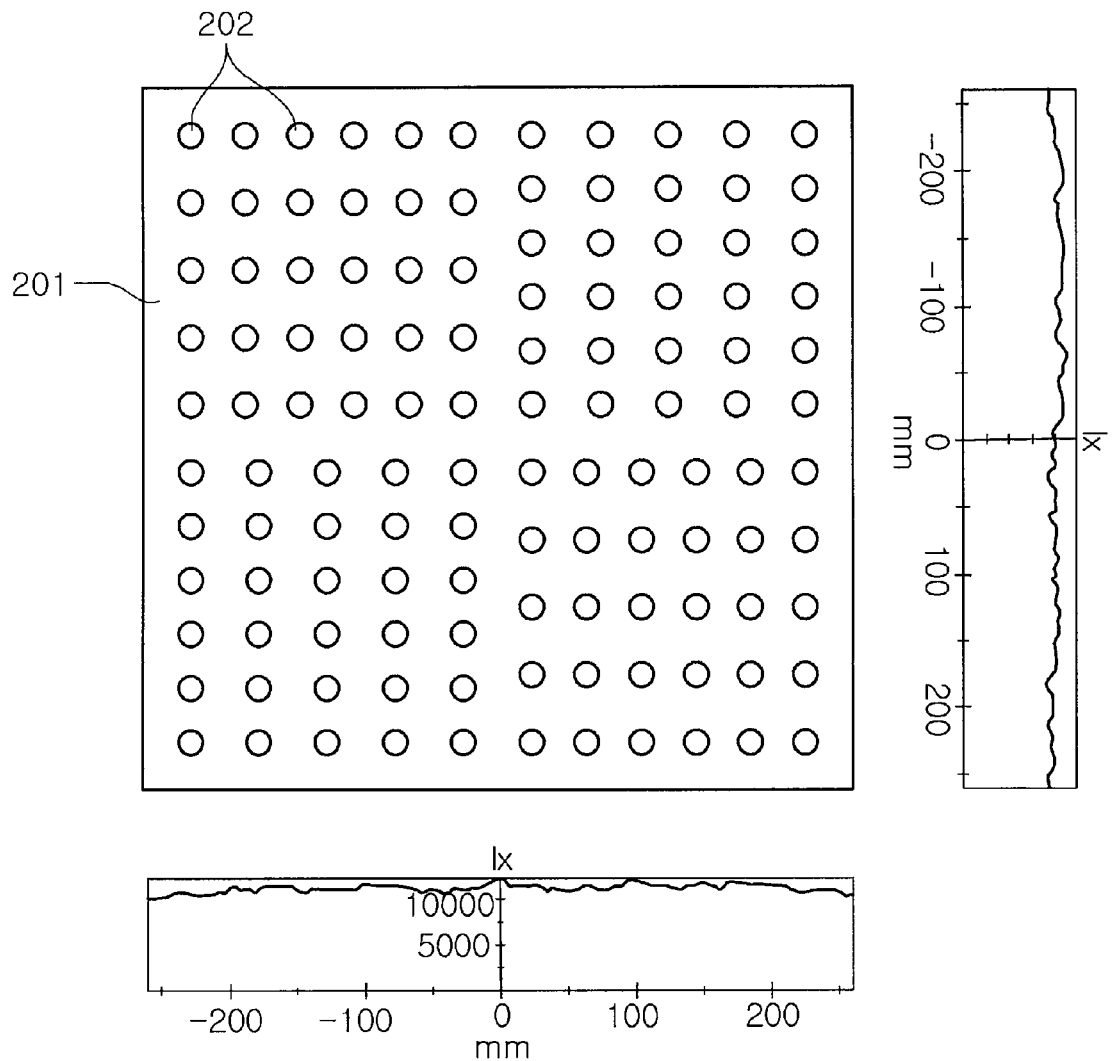
FIG. 9 is a graph showing a luminance distribution in a light emission region of the planar light source of FIG. 2.

FIG. 9 is a graph showing a luminance distribution in the light emission region of the planar light source of FIG. 2. Referring to FIG. 9, in the case of the planar light source having a structure of FIG. 2, the luminance distribution is uniform over the entire light emission region even if a region exists where arrangement pitches of the light emitting devices 202 are different. As described above, the deterioration of the luminance that may be caused due to the decrease in number of light emitting devices 202, may be overcome by increasing injection currents.

According to the present invention, a planar light source can be obtained, which can achieve a uniform luminance distribution and high efficiency while using a decreased number of light emitting devices by optimizing an arrangement and an interval of the light emitting devices. Also, a backlight unit can be obtained, which can improve light emission efficiency by employing the planar light source and controlling a location of an optical sheet.

While the present invention has been shown and described in connection with the exemplary embodiments, it will be apparent to those skilled in the art that modifications and variations can be made without departing from the spirit and scope of the invention as defined by the appended claims.

What is claimed is:

1. A planar light source comprising:
a light emission region formed by arrangements of a plurality of light emitting devices, the light emission region including first to $n^{th}$ separate parts each having a center of the light emission region as one of vertexes thereof, where n is a natural number of 3 or higher,
wherein the first separate part includes a plurality of light emitting devices having a two-dimensional arrangement structure in first and second directions which are different from each other, and a pitch in the first direction is different from a pitch in the second direction in at least a portion of the two-dimensional arrangement structure, and
light emitting devices included in each of the second to $i^{th}$ separate parts have an arrangement structure obtained by a clockwise or counter-clockwise rotation of the arrangement structure of the light emitting devices of the first separate part by an angle of $((i-1)/n) \times 360°$ about the center of the light emission region, wherein i is a natural number which satisfies $2 \leq i \leq n$.

2. The planar light source of claim 1, wherein the light emission region has a regular n-gon shape.

3. The planar light source of claim 2, wherein the light emission region has a regular square shape.

4. The planar light source of claim 1, wherein the light emission region has a circular shape.

5. The planar light source of claim 1, wherein the first and second directions form an angle of $1/n \times 360°$ therebetween.

6. The planar light source of claim 5, wherein the first direction is the same as a direction of a boundary line between the first separate part and the second separate part, and the second direction is the same as a direction of a boundary line between the first separate part and the $n^{th}$ separate part.

7. The planar light source of claim 1, wherein the light emitting device is a light emitting diode (LED).

8. The planar light source of claim 1, wherein the pitch in the first direction ranges from about 26 mm to about 27 mm.

9. The planar light source of claim 8, wherein the pitch in the second direction ranges from about 29 mm to about 37 mm.

10. The planar light source of claim 1, wherein the light emitting device emits white light.

11. A backlight unit comprising:
a substrate;
a planar light source comprising a light emission region formed by arrangement structures of a plurality of light emitting devices, the light emission region including first to nth separate parts each having a center of the light emission region as one of vertexes thereof, where n is a natural number of 3 or higher, wherein the first separate part includes a plurality of light emitting devices having a two-dimensional arrangement structure in first and second directions which are different from each other, and a pitch in the first direction is different from a pitch in the second direction in at least a portion of the two-dimensional arrangement structure, and light emitting devices included in each of the second to $i^{th}$ separate parts have an arrangement structure obtained by a clockwise or counter-clockwise rotation of the arrangement structure of the light emitting devices of the first separate part by an angle of $((i-1) \times 360°$ about the center of the light emission region, wherein i is a natural number which satisfies $2 \leq i \leq n$; and
a diffusion sheet disposed on the planar light source and uniformly diffusing light incident from the planar light source.

12. The backlight unit of claim 11, wherein a distance from a top surface of each of the light emitting devices included in the planar light source to the diffusion sheet is greater than a distance between adjacent ones of the light emitting devices.

13. The backlight unit of claim 11, further comprising a reflective layer disposed on the substrate and reflecting light emitted from the light emitting devices upwardly.

14. A planar light source comprising:
a light emission region formed by arrangements of a plurality of light emitting devices, the light emission region including first and second separate parts each having a center line of the light emission region as one of sides thereof,
wherein the first separate part includes a plurality of light emitting devices having a two-dimensional arrangement structure in first and second directions which are different from each other, and all of the pitch in the first direction is different from all of the pitch in the second direction in at least a portion of the two-dimensional arrangement structure, and
light emitting devices included in the second separate part has an arrangement structure obtained by a clockwise rotation of the arrangement structure of the light emitting devices of the first separate part by an angle of 90° about the center line of the light emission region.

* * * * *